G. KING.
TOY.
APPLICATION FILED JUNE 12, 1918.

1,319,347.

Patented Oct. 21, 1919.

WITNESSES
George A. Myers

INVENTOR
GUY KING,
BY
ATTORNEYS

UNITED STATES PATENT OFFICE.

GUY KING, OF ATLANTA, GEORGIA.

TOY.

1,319,347.   Specification of Letters Patent.   Patented Oct. 21, 1919.

Application filed June 12, 1918. Serial No. 239,600.

*To all whom it may concern:*

Be it known that I, GUY KING, a citizen of the United States, and a resident of Atlanta, in the county of Fulton and State of Georgia, have invented certain new and useful Improvements in Toys, of which the following is a specification.

My invention is an improvement in tools, and has for its object to provide a toy of the vehicle type, wherein pairs of front and rear wheels are provided, each pair having an axle, the axle of the rear pair being secured to a plate which carries a seat while the axle of the front pair is secured to a plate having a tongue, the plate being pivoted to the plate.

Figure 1:
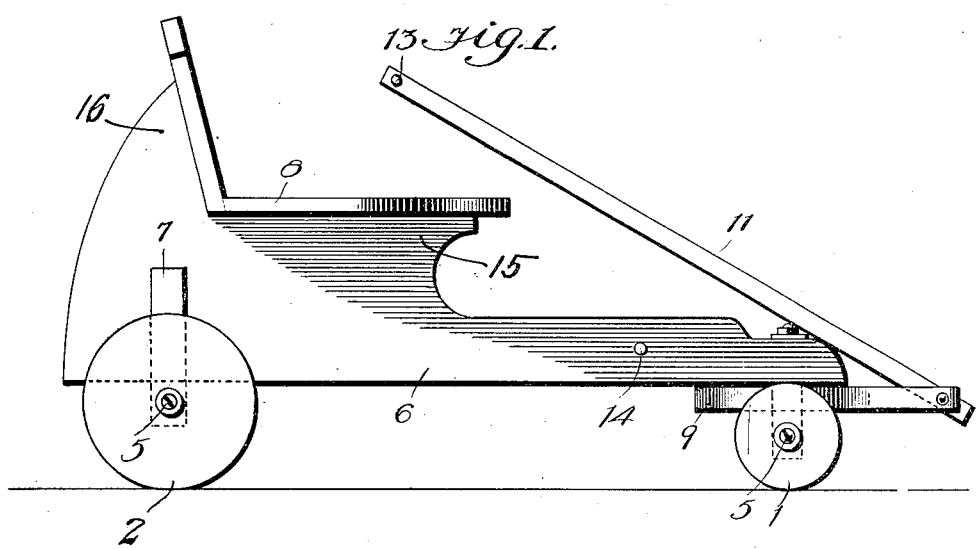
Figure 1 is a side view of the improved toy.
Figure 2:
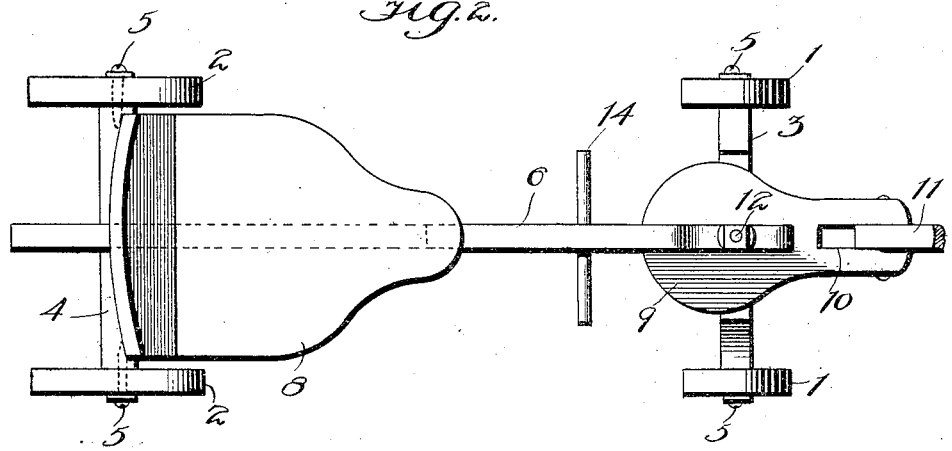
Fig. 2 is a top plan view.

In the present embodiment of the invention pairs of front and rear wheels 1 and 2 are provided, each pair being journaled on an axle 3 and 4, respectively, the connection in the present instance being made by means of screws 5 which are passed through the hubs of the wheels into engagement with the ends of the axle.

A plate 6 is secured at its rear end to the center of the rear axle by means of plates 7 secured to the axle and engaging the opposite faces of the plate, and it will be noticed that this plate is arranged with its wide dimension vertical and is of greatest depth at the rear axle to provide a raised support for a seat 8. The seat is formed by two plates arranged at an obtuse angle with respect to each other, the upper edge of the plate 6 being notched or cut away to form a series of steps decreasing in height toward the front of the plate, and the seat is arranged with the seat portion on the uppermost step 15 with the back secured to the riser 16 of the said step to receive the plates and support them in proper position, and these plates are secured to the plate.

A plate 9 is secured to the front axle at the center thereof and this plate, which is rounded at its rear end and longitudinally recessed at its front end, as indicated at 10, has a tongue 11 pivoted within the recess. This plate 9 is pivotally connected to the plate 6 at its front end as indicated at 12 in order that the plate and the axle may be turned with respect to the plate. The tongue 11 is of such length that when turned back upon the plate 6 as shown in Fig. 1 the cross head 13 at the free end of the tongue will be in position to be grasped by the occupant of the seat to steer the vehicle. A cross rod 14 is arranged transversely of the plate 6 in convenient position for engagement by the foot of the occupant.

In use, the child sits in the seat 8, grasping the cross head 13, and propels the vehicle by means of his or her feet pushing on the ground. When coasting the feet may rest upon the cross rod 14.

I claim:

A device of the character specified comprising a plate arranged with its wide dimension vertical, an axle carrying rear wheels secured transversely of the under edge of the rear end of the plate, a plate pivoted to the front end of the first named plate, an axle secured transversely on the last named plate and carrying front wheels, a tongue pivoted to the last named plate, said first named plate being cut away on its upper edge to form a series of steps decreasing in height toward the front thereof, and a riser for each step, a seat being secured to one of said steps, and a back to the riser at the rear of the said step, and a foot rest arranged transversely of the said first named plate.

GUY KING.

Witnesses:
G. H. BUTLER,
T. T. FLAGLER.

Copies of this patent may be obtained for five cents each, by addressing the "Commissioner of Patents, Washington, D. C."